US011930281B2

(12) United States Patent
Lim et al.

(10) Patent No.: US 11,930,281 B2
(45) Date of Patent: Mar. 12, 2024

(54) ELECTRONIC DEVICE WITH CAMERA AND METHOD THEREOF

(71) Applicant: Samsung Electronics Co., Ltd., Suwon-si (KR)

(72) Inventors: Kwangyong Lim, Suwon-si (KR); Kyungheum Yi, Suwon-si (KR); Seongsin Kwak, Suwon-si (KR); Sungoh Kim, Suwon-si (KR); Daekyu Shin, Suwon-si (KR); Dasom Lee, Suwon-si (KR); Sanghun Lee, Suwon-si (KR); Seoyoung Lee, Suwon-si (KR); Daiwoong Choi, Suwon-si (KR); Jihwan Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/571,048

(22) Filed: Jan. 7, 2022

(65) Prior Publication Data

US 2022/0201203 A1    Jun. 23, 2022

Related U.S. Application Data

(63) Continuation of application No. PCT/KR2021/019640, filed on Dec. 22, 2021.

(30) Foreign Application Priority Data

Dec. 22, 2020  (KR) .......... 10-2020-0180859

(51) Int. Cl.
*H04N 23/667* (2023.01)
*H04N 1/21* (2006.01)
(Continued)

(52) U.S. Cl.
CPC .......... *H04N 23/80* (2023.01); *H04N 1/2137* (2013.01); *H04N 1/215* (2013.01); *H04N 23/64* (2023.01);
(Continued)

(58) Field of Classification Search
CPC . H04N 1/2129–215; H04N 23/63–635; H04N 23/64; H04N 23/667; H04N 23/676; H04N 23/743
See application file for complete search history.

(56) References Cited

U.S. PATENT DOCUMENTS 7,362,354 B2    4/2008  Lin
10,148,879 B2   12/2018 Jung et al.
(Continued)

FOREIGN PATENT DOCUMENTS

JP    2016-052013 A    4/2016
JP    2017-041797 A    2/2017
(Continued)

OTHER PUBLICATIONS

International Search Report and written opinion dated Mar. 29, 2022, issued in International Application No. PCT/KR2021/019640.
(Continued)

*Primary Examiner* — Paul M Berardesca
(74) *Attorney, Agent, or Firm* — Jefferson IP Law, LLP

(57) ABSTRACT

An electronic device is provided. The electronic device includes a camera module, a sensor module, at least one processor configured to be operatively connected to the camera module and the sensor module, and a memory configured to be operatively connected to the at least one processor. The memory may be configured, when executed, to cause the at least one processor to acquire a plurality of first images having a first attribute and at least one second image having a second attribute for a designated time by controlling the camera module according to a photographing mode of the camera module determined based on at least one of illuminance detected through the sensor module and scene information detected through the camera module, extract information on an event section when the event is
(Continued)

detected from the plurality of first images, and select and buffer at least one third image from the at least one second image according to the photographing mode, generate at least one piece of first content based on the information on the event section of the plurality of first images, and select at least one fourth image by evaluating at least some of the at least one third image, and generate at least one piece of second content based on the selected at least one fourth image.

19 Claims, 10 Drawing Sheets

(51) Int. Cl.
    *H04N 23/60*     (2023.01)
    *H04N 23/80*     (2023.01)
    *H04N 101/00*     (2006.01)

(52) U.S. Cl.
    CPC ....... *H04N 23/667* (2023.01); *H04N 2101/00* (2013.01); *H04N 2201/0084* (2013.01)

(56) References Cited

U.S. PATENT DOCUMENTS

| | | | |
|---|---|---|---|
| 11,057,563 | B2 | 7/2021 | Nabetani et al. |
| 2008/0079817 | A1* | 4/2008 | Murata ............... H04N 23/667 348/222.1 |
| 2009/0324098 | A1* | 12/2009 | Nilsson ................. H04N 1/215 382/209 |
| 2010/0315521 | A1* | 12/2010 | Kunishige ............ H04N 23/673 348/E5.037 |
| 2011/0193990 | A1 | 8/2011 | Pillman et al. |
| 2011/0292235 | A1* | 12/2011 | Takada ................ H04N 23/667 348/222.1 |
| 2013/0265451 | A1 | 10/2013 | Son et al. |
| 2014/0176774 | A1* | 6/2014 | Morimoto ............. H04N 23/64 348/207.99 |
| 2016/0119536 | A1* | 4/2016 | Carceroni ............. G06V 20/47 348/207.1 |
| 2017/0006251 | A1 | 1/2017 | Keating et al. |
| 2018/0367752 | A1 | 12/2018 | Donsbach et al. |
| 2019/0281219 | A1 | 9/2019 | Li |
| 2021/0195084 | A1* | 6/2021 | Olajos ................... H04N 23/72 |

FOREIGN PATENT DOCUMENTS

| | | |
|---|---|---|
| JP | 2019-186791 A | 10/2019 |
| KR | 10-2008-0106668 A | 12/2008 |
| KR | 10-2013-0114893 A | 10/2013 |
| KR | 10-2017-0097414 A | 8/2017 |
| KR | 10-2020-0054320 A | 5/2020 |

OTHER PUBLICATIONS

European Search Report dated Oct. 25, 2022, issued in European Application No. 21 84 4605.

* cited by examiner

ELECTRONIC DEVICE WITH CAMERA AND METHOD THEREOF

CROSS-REFERENCE TO RELATED APPLICATION(S)

This application is a continuation application claiming priority under § 365(c), of an International application No. PCT/KR2021/019640, filed on Dec. 22, 2021, which is based on and claims the benefit of a Korean patent application number 10-2020-0180859, filed on Dec. 22, 2020, in the Korean Intellectual Property Office, the disclosure of which is incorporated by reference herein in its entirety.

TECHNICAL FIELD

The disclosure relates to an electronic device having a camera and a method thereof. More particularly, the disclosure relates to an electronic device and a method thereof, wherein multiple images are acquired by controlling a camera, and multiple image contents are generated based thereon.

BACKGROUND ART

In line with development of technologies, electronic devices are evolving such that various functions can be provided. For example, electronic devices may provide camera-related functions in addition to communication functions such as voice communication, message transmission/reception, and/or wireless Internet.

An electronic device having a camera (for example, an image sensor) may uses the camera so as to acquire image data including a still picture and/or moving picture. In addition, if the electronic device provides an image editing function, image contents may be generated, based on the acquired image data, through the editing function.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The user of an electronic device having a camera may directly acquire image data through multiple inputs and may generate image contents through multiple inputs. When various image contents are to be generated, the user needs to repeat such a process multiple times. In addition, it is impossible to acquire various types of image contents with regard to the same timepoint by using a single electronic device.

Aspects of the disclosure are to address at least the above-mentioned problems and/or disadvantages and to provide at least the advantages described below. Accordingly, an aspect of the disclosure is to provide an apparatus and method for configuring such that, based on a single user input related to photography in connection with an electronic device having a camera, an image is acquired according to the photographing mode, and various types of image contents are generated.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a camera module, a sensor module, at least one processor configured to be operatively connected to the camera module and the sensor module, and a memory configured to be operatively connected to the at least one processor, wherein the memory is configured, when executed, to cause the at least one processor to acquire a plurality of first images having a first attribute and at least one second image having a second attribute for a designated time by controlling the camera module according to a photographing mode of the camera module determined based on at least one of illuminance detected through the sensor module and scene information detected through the camera module, extract information on an event section when the event is detected from the plurality of first images, and select and buffer at least one third image from the at least one second image according to the photographing mode, generate at least one piece of first content based on the information on the event section of the plurality of first images, and select at least one fourth image by evaluating at least some of the at least one third image, and generate at least one piece of second content based on the selected at least one fourth image.

In accordance with another aspect of the disclosure, a method of an electronic device including a sensor module and a camera module is provided. The method includes acquiring a plurality of first images having a first attribute and at least one second image having a second attribute for a designated time by controlling the camera module according to a photographing mode of the camera module determined based on at least one of illuminance detected through the sensor module and scene information detected through the camera module, extracting information on an event section when the event is detected from the plurality of first images, and selecting and buffering at least one third image from the at least one second image according to the photographing mode, generating at least one piece of first content based on the information on the event section of the plurality of first images, and selecting at least one fourth image by evaluating at least some of the at least one third image, and generating at least one piece of second content based on the selected at least one fourth image.

Advantageous Effects of Invention

According to various embodiments, various types of image contents may be generated, based on a single user input related to photography in connection with an electronic device having a camera.

According to various embodiments, in connection with an electronic device having a camera, the photographing mode may be automatically determined, and various images may be acquired through the camera according to the photographing mode.

According to various embodiments, in connection with an electronic device having a camera, various images may be acquired selectively according to the photographing mode, and various types of image contents may be generated through an image post-processing process.

According to various embodiments, in connection with an electronic device having a camera, the photographing mode may be automatically determined, various images acquired according to the photographing mode may be selectively buffered, and the buffered images may be analyzed and chosen according to the photographing mode, thereby generating various types of image contents.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
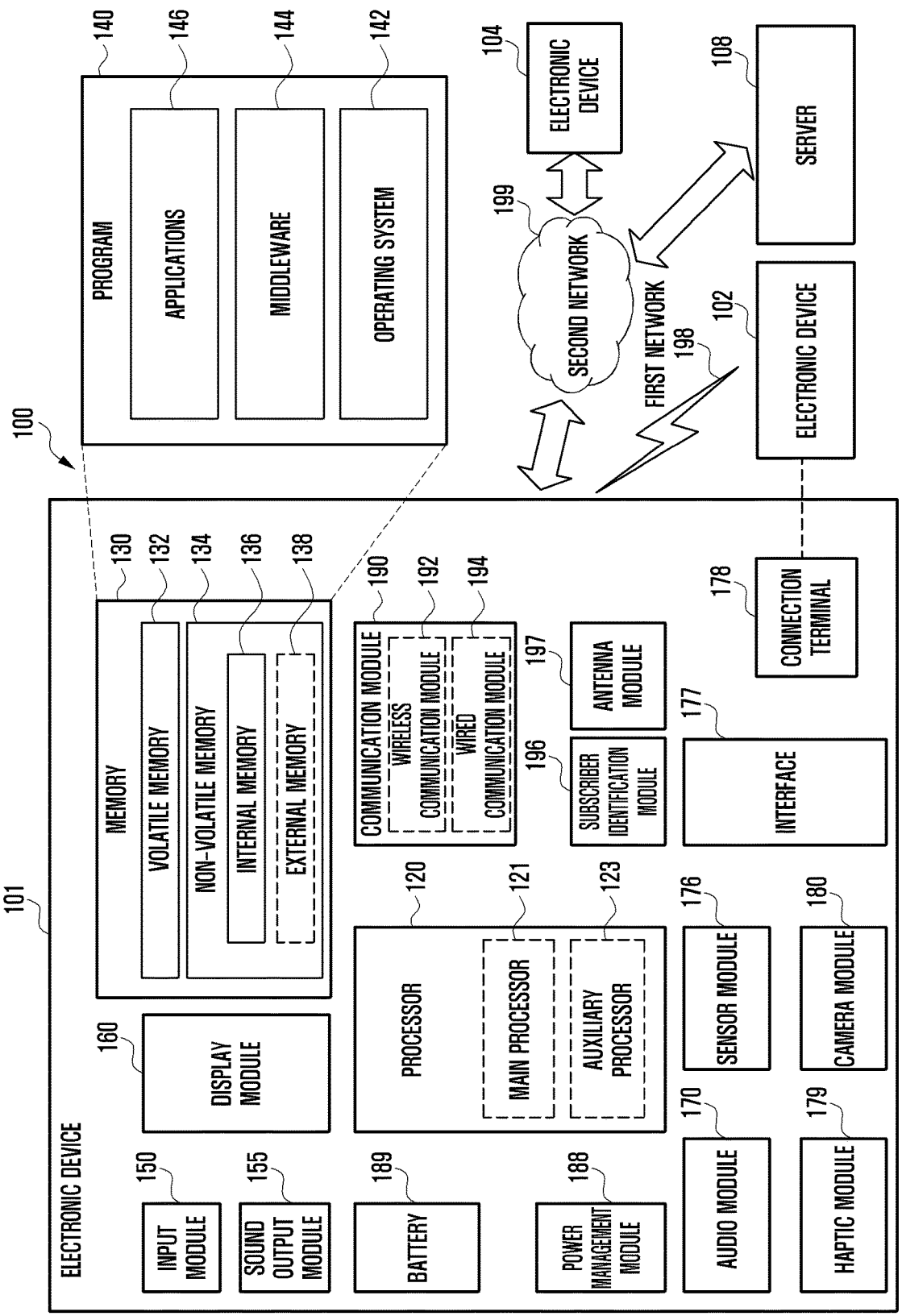
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
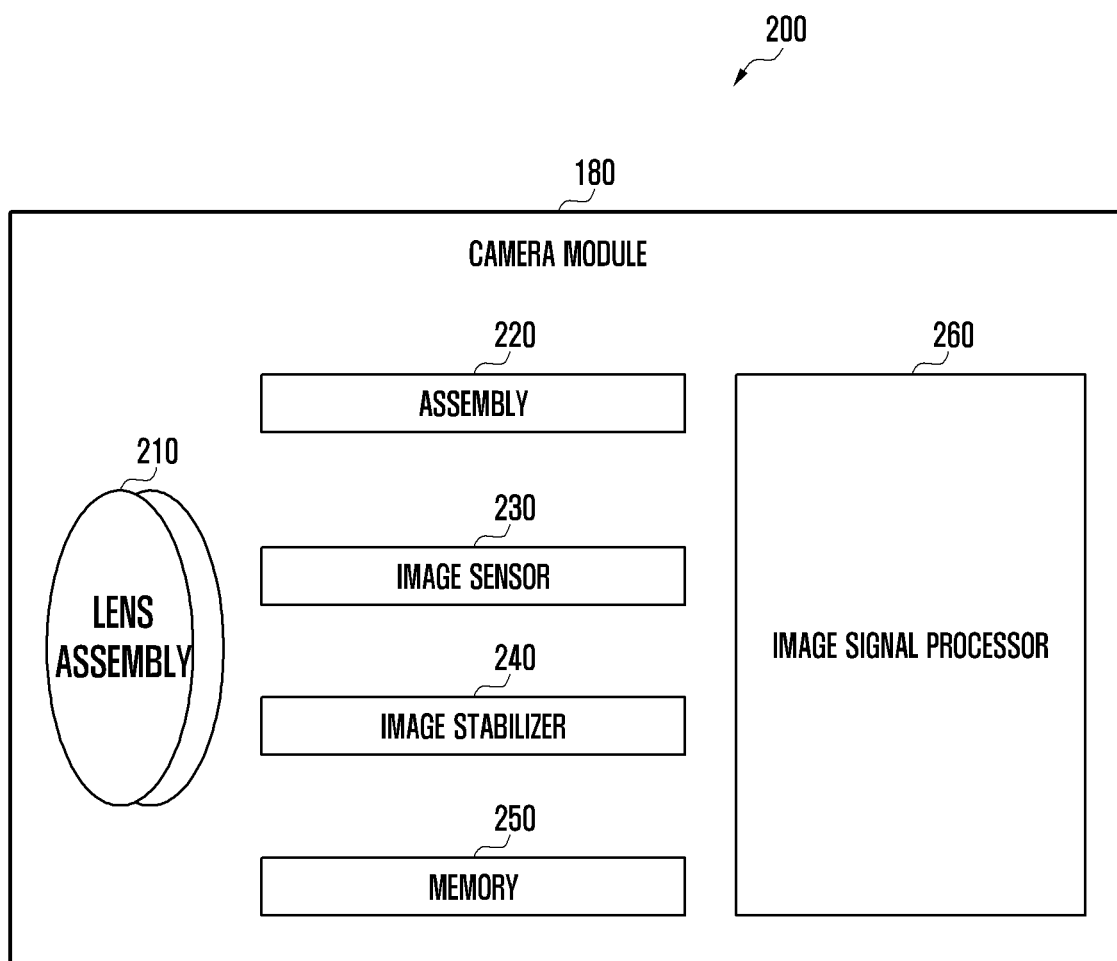
FIG. 2 is a block diagram illustrating a camera module according to an embodiment of the disclosure.

FIG. 2 is a block diagram illustrating the camera module according to an embodiment of the disclosure.

Referring to FIG. 2, a block diagram 200 illustrating the camera module 180 may include a lens assembly 210, a flash 220, an image sensor 230, an image stabilizer 240, memory 250 (e.g., buffer memory), or an image signal processor (ISP) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing tasks with respect to an image obtained via the image sensor 230 or an image stored in the memory 250. The one or more image processing tasks may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
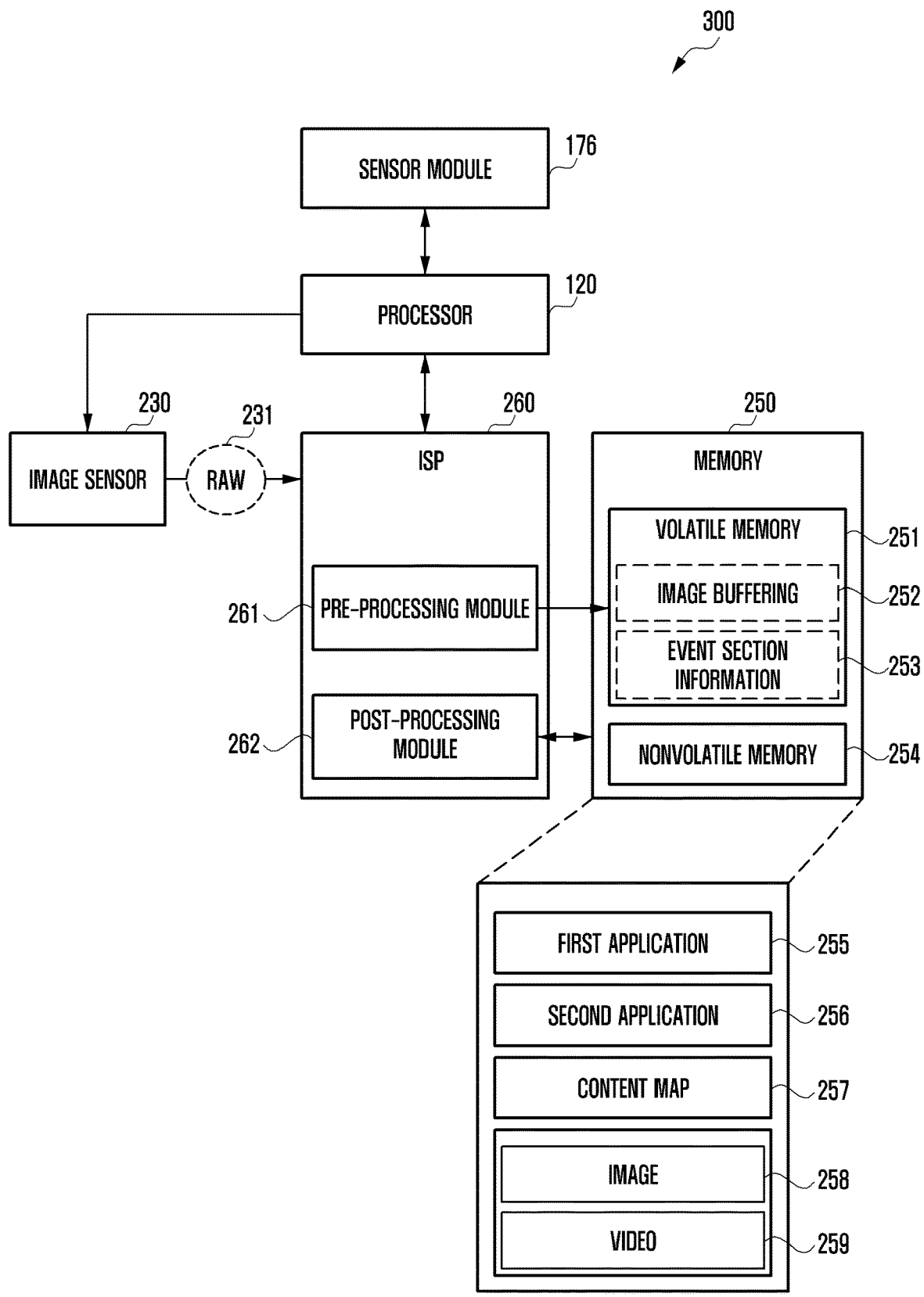
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 (e.g., the electronic device 101 of FIG. 1) may include an image sensor (e.g., the image sensor 230 of FIG. 2), a memory (e.g., the memory 250 of FIG. 2), an image signal processor (e.g., the image signal processor 260 of FIG. 2), a sensor module (e.g., the sensor module 176 of FIG. 1), and a processor (e.g., the processor 120 of FIG. 1). For example, the components of the electronic device 300 of FIG. 3 illustrate components necessary for description of various embodiments, but are not limited thereto. For example, the electronic device 300 may include a plurality of image sensors 230. For example, the electronic device 300 may include a plurality of camera modules (e.g., the camera module 180 of FIG. 1). For example, the electronic device 300 may further include one or more components (e.g., the display module 160 or the input module 150) among the components of the electronic device 101 of FIG. 1. For example, the components of the electronic device 300 may perform the same or at least partially the same functions as the components (e.g., the processor 120 and/or the sensor module 176) described with reference to FIG. 1 or 2, and repeated descriptions below may be omitted.

According to various embodiments, the processor 120 may include an image signal processor (e.g., the auxiliary processor 123 of FIG. 1) that can operate independently or together with an application processor (e.g., the main processor 121 of FIG. 1). For example, the image signal processor 260 may be implemented separately from or as a part of the main processor 121. For example, the image signal processor 260 may be configured as at least a part of the processor 120, or as a separate processor operated independently of the processor 120.

According to various embodiments, when the processor 120 receives a user input for acquiring image content, the processor 120 may acquire a plurality of first images of a first attribute and at least one second image of a second attribute different from the first attribute through the image sensor 230 for a designated time. For example, the acquired first image and second image may include original image data (e.g., raw data 231). For example, since the first image and the second image are generated based on image information acquired through the image sensor 230 for a designated time, the second image may include the same time information (e.g., time stamp) as at least a portion of the first image.

For example, the first images are a plurality of preview images (e.g., moving pictures) acquired in a first period (acquired periodically) for a designated time, and may include a first attribute having a relatively smaller resolution than that of the second image (for example, the first attribute may correspond to a first image resolution). For example, the first period may be a period corresponding to a rate of 24 frames per second (24 fps) or higher (e.g., 30 fps or 60 fps). For example, the first images may be acquired periodically at a rate corresponding to 24 frames per second (24 fps) or higher.

For example, the second image is at least one captured image (e.g., still image) acquired for a designated time and may include a second attribute having a relatively higher resolution than that of the first image (for example, the second attribute may correspond to a second image resolution, whereby the second image resolution is higher than the first image resolution). For example, the second image may be acquired when focus is achieved based on focus information on an external object (e.g., subject) according to an auto-focus (AF) function, but is not limited thereto. For example, the second image may be acquired in a designated period according to a photographing mode.

According to various embodiments, the second image may be acquired based on a first photographing mode (e.g., a continuous photographing mode or a burst shot) or a second photographing mode (e.g., a general photographing mode).

For example, the continuous photographing mode may include a method of generating a plurality of captured images by continuously capturing a plurality of images at a designated time point through the image sensor 230. For example, in the continuous photographing mode, the second image may be acquired in a second period different from the first period for a designated time. For example, the second period may be relatively longer than the first period. For example, the second period may be a period corresponding to a rate of 10 frames per second (10 fps). For example, the second image may be acquired periodically at a rate corresponding to 10 frames per second (10 fps).

For example, the general photographing mode may include a method of generating a captured image by capturing an image at a designated time point through the image sensor 230. For example, in the general photographing mode, the second image may be acquired in a third period that is relatively longer than the second period. For example, the third period may be a period corresponding to a rate of 3 frames per second (3 fps). For example, the second image may be acquired periodically at a rate corresponding to 3 frames per second (3 fps).

According to various embodiments, the designated time may include a designated time interval for acquiring a first image and/or a second image to generate various types of image content. For example, the designated time may be configured within a time longer than a minimum time supported by the electronic device 101 and shorter than a maximum time to acquire a plurality of images including a first image and/or a second image. For example, the designated time may be selected or configured by a user input.

According to various embodiments, the processor 120 may acquire illuminance information through the sensor module 176 (e.g., an illuminance sensor) and/or the camera module 180. For example, the illuminance information may include a brightness level (e.g., measured in units of lux or exposure value (EV)) of a place where the electronic device 101 is currently located.

According to various embodiments, the processor 120 may acquire scene information (e.g., a scene category or a scene property) about an image to be acquired through the image sensor 230. For example, the scene information may include information indicating that the place where the electronic device 101 is currently located is outdoors (e.g., a landscape including the sky, a mountain, or a forest), information indicating that the electronic device 101 is located indoors (e.g., an indoor environment such as furniture or a ceiling), and/or external object information (e.g., including a movable subject such as a person or an animal). For example, the processor 120 may acquire scene information through a preview screen before image acquisition.

According to various embodiments, the processor 120 may use location information about the place where the electronic device 101 is located, which is acquired through the sensor module 176 (e.g., global positioning system (GPS)) to supplement or replace the above-described scene information, as information for determining whether the electronic device 101 is located outdoors or indoors.

According to various embodiments, the processor 120 may determine the photographing mode based on the acquired scene information and/or illuminance information. For example, in case of high illuminance (e.g., 2000 lux or more or 1800 EV or more) according to the illuminance information, the photographing mode may be determined as the continuous photographing mode. For example, in low illuminance (e.g., 800 lux or less or 1000 EV or less) according to the illuminance information, the photographing mode may be determined as the general photographing mode. For example, the photographing mode may be determined as the continuous photographing mode when the electronic device is located outdoors according to the scene information. For example, even when the electronic device 101 is located outdoors according to the scene information, the photographing mode may be determined as the general photographing mode in case of low illuminance (e.g., 800 lux or less or 1000 EV or less) according to the illuminance information. For example, when the electronic device 101 is located outdoors according to the scene information and the scene information includes a movable external object (e.g., a person or an animal), the photographing mode may be determined as the continuous photographing mode. For example, when the electronic device 101 is located outdoors according to the scene information, the scene information includes a movable external object (such as a person or an animal), and the corresponding illuminance is high illuminance (2000 lux or more or 1800 EV or more) according to the illuminance information, the photographing mode may be determined as the continuous photographing mode.

According to various embodiments, the processor 120 may control the camera module 180 according to the determined photographing mode to acquire a plurality of first images of a first attribute according to a first period for a designated time and acquire at least one second image of a second attribute different from the first attribute according to a second period or a third period through the image sensor 230. For example, the first image and the second image may be original image data (e.g., raw data 231). For example, in the first photographing mode (e.g., continuous photographing mode), at least one second image may be acquired according to the second period, and in the second photographing mode (e.g., general photographing mode), at least one second image may be acquired according to the third period.

According to various embodiments, the processor 120 may control the image signal processor 260 (e.g., the pre-processing module 261) according to the determined photographing mode to select at least one third image from the plurality of second images (e.g., raw data) output from the image sensor 230 and to perform temporal buffering 252 on the selected third image in the volatile memory 251 of the memory 250. For example, at least some of the components of the memory 250 may be disposed in the camera module 180 separately from an external memory (e.g., the memory 130 of FIG. 1). For example, the volatile memory 251 of the memory 250 may be disposed in the camera module 180. For example, at least some of the elements stored in the nonvolatile memory 254 of the memory 250 may be stored in the memory 130. For example, the first application 255, the second application 256, and/or the content map 257 among the nonvolatile memories 254 of the memory 250 may be stored in the memory 130.

According to various embodiments, the processor 120 may select at least one third image (e.g., an image 258 or a video 259) from the plurality of second images acquired and output by the image sensor 230 in the first photographing mode (e.g., the continuous photographing mode) through the image signal processor 260 (e.g., the pre-processing module 261), and may perform temporal buffering 252 on the selected third image in the volatile memory 251 of the memory 250. For example, the image signal processor 260 (e.g., the pre-processing module 261) may acquire at least one third image by analyzing similarity between image frames with respect to the plurality of acquired second images. For example, the image signal processor 260 (e.g., the preprocessing module 261) may calculate an image hash value for the plurality of second images and may analyze similarity between consecutive image frames based on the calculated image hash value, so that frames with high similarity (for example, greater than or equal to a predetermined, calculated or otherwise set value for similarity) may be excluded and the extracted at least one third image may be buffered.

According to various embodiments, the processor 120 may select at least one third image from the plurality of second images acquired and output by the image sensor 230 in the second photographing mode (e.g., general photographing mode) through the image signal processor 260 (e.g., the pre-processing module 261) and may perform temporal buffering on the selected third image in the volatile memory 251 of the memory 250. For example, the image signal processor 260 (e.g., the pre-processing module 261) may analyze the image quality of the acquired plurality of second images to acquire at least one third image. For example, the image signal processor 260 (the pre-processing module 261) may detect image focus (e.g., blur detection) for the plurality of acquired second images so that images with poor quality due to out of focus (for example, having a focus less than or equal to a predetermined, calculated or otherwise set value for focus; or having an amount of blur greater than or equal to a predetermined, calculated or otherwise set value for blur) may be excluded and the extracted at least one third image may be buffered.

According to various embodiments, the processor 120 may detect motion information from a plurality of first images through the image signal processor 260 (e.g., pre-processing module 261), and when it is determined that an event occurs based on the detected motion information. For example, the event may include change or movement in the plurality of first images such as a movement of an object in the plurality of first images. For example, the event section information may correspond to information on a section of the designated time when the event occurs. The processor 120 may acquire event section information 253 and may temporarily buffer the acquired event section information in the volatile memory 251 of the memory 250. For example, the event section information may correspond to information on a period in the designated time during which the event is detected to occur.

For example, the motion information may include motion information (e.g., speed) calculated by tracking the movement of at least one object in an image (e.g., object tracking). For example, motion information may be calculated by evaluating (e.g., optical flow) the movement of an object based on a change in landmarks such as a designated pattern in an image, for example, a change in photographing time, a change in brightness, or a change in a background (e.g., the surrounding environment).

For example, whether an event occurs may be determined based on a change in motion information. For example, it may be determined that an event has occurred when the motion information decreases after an increase in the motion information. For example, it may be determined that the event has occurred when the motion information increases by a designated threshold value or greater.

For example, the event section information may include time information, scene information, length information and/or speed information for a section in which the event occurs (that is, the event section information may include at least one of these types of information). For example, the event section information may include time information at a time point at which the motion information increases and a time point at which the motion information decreases. For example, the event section information may include scene information (e.g., a scene category or a scene type) including information about an object that is moved in the event section (e.g., a person jumps) and/or movement. For example, the event section information may include time information at the time point at which the motion information increases by a designated threshold value or greater and time information at the time point at which the motion information decreases by the designated threshold value or less. For example, the event section information may include section length information from a time point at which the motion information increases to a time point at which the motion information decreases. For example, the event section information may include speed information such as an average speed and/or a maximum speed of the motion information within the section in which the event occurs.

According to various embodiments, the processor 120 may load a first application 255 stored in the nonvolatile memory 254 of the memory 250, and may perform determination of photographing mode, acquisition of the first image and photographing mode-based second image for a designated period, selection and buffering of the third image from the second image according to the photographing mode, and/or acquisition of the event section information from the first image, which have been described above by the loaded first application 255.

According to various embodiments, the processor 120 may load a second application 256 stored in the nonvolatile memory 254 of the memory 250, and may perform an operation of generating first content and second content based on the first image(s) and the third image(s), respectively, which will be described later, by the loaded second application 256.

According to various embodiments, the processor 120 may control the image signal processor 260 (e.g., the post-processing module 262) to generate first content based on the plurality of first images according to the event section information 253 temporarily buffered in the volatile memory 251 of the memory 250, and/or may generate second content from the buffered third image 252 temporarily buffered in the volatile memory 251 of the memory 250.

According to various embodiments, the processor 120 may control the image signal processor 260 (e.g., the post-processing module 262) to generate the first content based on the plurality of first images according to the event section information 253 temporarily buffered in the volatile memory 251 of the memory 250.

According to various embodiments, the processor 120 may apply an image effect to at least some of the plurality of first images based on the event section information through the image signal processor 260 to generate the first content. For example, the processor 120 may select the type of a video to be generated from the first image based on the scene information (e.g., scene category or scene type) of the plurality of first images and/or the event section information.

For example, the scene category may include a place, an object, a pet, a portrait, people, a vehicle, a landscape, or text. For example, the scene type may include subtypes (e.g., whether the place is indoors or outdoors, whether the pet is a cat or a dog, an object type, whether a subject of a portrait is a baby, a woman, or a face, whether a landscape is a tree, mountain, beach, sky, sunrise, city, or sunset) of the scene category.

For example, the processor 120 may generate at least one video based on the plurality of first images. For example, the processor 120 may generate a first video in which a plurality of first images are continuously reproduced in the entire or event section. For example, when the movement speed of the event section is fast or the length of the section is short, the processor 120 may generate a second video in which the plurality of first images are reproduced at a relatively faster speed than that of the first video in the event section. For example, when the movement speed of the event section is slow or the length of the section is long, the processor 120 may generate a third video in which the plurality of first images are reproduced at a relatively slower speed than that of the first video in the event section. For example, when the movement speed of the event section is fast or the length of the section is short (e.g., golf shot or baseball swing), the processor 120 may generate a fourth video (e.g., dynamic video) obtained by adjusting the speed of the event section as in slow motion through an increase in the number of frames per second during the event section and/or a speed reduction. For example, the processor 120 may sequentially arrange at least one fourth image selected from the third images and some of the first images corresponding to the event section based on time information (e.g., time stamp), so that a fifth video (e.g., highlight video) capable of summarizing and indicating the contents and/or progress of the entire event may be generated by adding, for example, a transition effect at the time of conversion between the fourth image and the first image. For example, the processor 120 may generate a sixth video in which the plurality of first images are reproduced in order and then reproduced in reverse order in the event section. For example, the processor 120 may generate a seventh video in which the plurality of first images are reproduced in reverse order in the event section. For example, when the plurality of first images includes landscape photos in the event section, the processor 120 may generate an eighth video expressing the passage of time during the day and night by changing the color and brightness of the background. For example, an image effect applicable to the first image based on the scene information may be configured as a content map 257 and stored in a memory (e.g., the memory 130 of FIG. 1 or the memory 250 of FIG. 2 or 3) in advance.

According to various embodiments, the processor 120 may select at least one fourth image from the buffered third image 252 temporarily buffered in the volatile memory 251 of the memory 250 through the image signal processor 260 (e.g., the post-processing module 262) and may generate second content by applying an image effect based on the scene information (e.g., scene category or scene type).

According to various embodiments, through the image signal processor 260 (e.g., the post-processing module 262), the processor 120 may analyze the temporarily buffered third image 252 and may select at least one fourth image based on the analyzed third image.

For example, the processor 120 may select at least one fourth image as at least one candidate image for generating a still image among the temporarily buffered third images. For example, the candidate image may be selected based on at least one of the image quality of at least one third image, brightness information of the third image, color information of the third image, the composition of an external object (e.g., subject) included in the third image, or face detection information detected from the third image. For example, the image quality may be configured based on focus information (e.g., blur) of the external object included in the third image, noise included in the third image, or contrast information of the third image. For example, the processor 120 may exclude similar images from the at least one candidate image. For example, similarity may be determined by comparing the focus information, the noise information, or the contrast information etc. for the third image to a predetermined or calculated value corresponding to the relevant one of focus, noise or contrast etc.

According to various embodiments, the processor 120 may generate second content by applying an image effect based on the scene information to the at least one fourth image selected through the image signal processor 260. For example, the image effect applicable to the fourth image based on the scene information may be configured as, for example, the content map 257 and may be stored in a memory (e.g., the memory 130 of FIG. 1 or the memory 250 of FIG. 2 or 3) in advance.

According to an embodiment, the processor 120 may generate at least one still image based on the selected at least one fourth image. For example, the processor 120 may select an image effect to be applied to at least one fourth image selected as a candidate image. For example, the processor 120 may determine whether to apply the image effect to the fourth image based on the scene information (e.g., scene category or scene type) of the at least one fourth image, and/or may select the image effect to be applied to the fourth image. For example, the image effect may be applied through a series of operations for changing at least one of color, transparency, style, contrast, or saturation of the fourth image.

According to various embodiments, an electronic device (e.g., the electronic device 101 of FIG. 1 or the electronic device 300 of FIG. 3) may include a camera module 180, a sensor module 176, at least one processor (e.g., the processor 120 of FIG. 1 or the image signal processor 260 of FIG. 2) configured to be operatively connected to the camera module 180 and the sensor module 176, and a memory (e.g., the memory 130 of FIG. 1 or the memory 250 of FIG. 2 or 3) configured to be operatively connected to the at least one processor 120 or 260.

According to various embodiments, the memory 130 or 250 may be configured, when executed, to cause the processor 120 or 260 to acquire a plurality of first images having a first attribute and at least one second image having a second attribute for a designated time by controlling the camera module 180 according to a photographing mode of the camera module 180 determined based on at least one of illuminance detected through the sensor module 176 and scene information detected through the camera module 180, extract information on an event section when the event is detected from the plurality of first images, select and buffer at least one third image from the at least one second image according to the photographing mode, generate at least one piece of first content based on the information on the event section of the plurality of first images, select at least one fourth image by evaluating at least some of the at least one third image, and generate at least one piece of second content based on the selected at least one fourth image.

According to various embodiments, the processor 120 or 260 may be configured to acquire the first image in a first period for the designated time, acquire the second image in a second period in a first photographing mode according to the determined photographing mode, and acquire the second image in a third period in a second photographing mode, and the second period may be configured to be relatively longer than the first period and the third period may be configured to be relatively longer than the second period.

According to various embodiments, the processor 120 or 260 may be configured to select the at least one third image based on similarity between image frames with respect to the at least one second image in the first photographing mode.

According to various embodiments, the processor 120 or 260 may be configured to select the at least one third image based on image quality of the at least one second image in the second photographing mode.

According to various embodiments, the processor 120 or 260 may be configured, in the first photographing mode, to select at least one fifth image by analyzing the at least one third image and select the at least one fourth image by evaluating the at least one fifth image.

According to various embodiments, the analysis may be configured to include at least one of blur detection, blink detection, expression-based filter, or affine similarity with respect to the third image.

According to various embodiments, the processor 120 or 260 may be configured to generate the at least one second content through at least one of image effect application, image quality correction, composition change, or collage generation which changes color, transparency, style, contrast, or saturation for at least some elements in the at least one fourth image based on scene information of the at least one fourth image.

According to various embodiments, the processor 120 or 260 may be configured to acquire motion information from the plurality of first images and extract the event section information based on a change in the motion information.

According to various embodiments, the event section information may include at least one of time information, scene information, length information, or speed information for the event.

According to various embodiments, the processor 120 or 260 may be configured to generate a video in which at least some of the plurality of first images are continuously reproduced by selectively changing at least one of a section length, a reproduction speed, a reproduction order, or an image effect based on the scene information based on the event section information.

Figure 4:
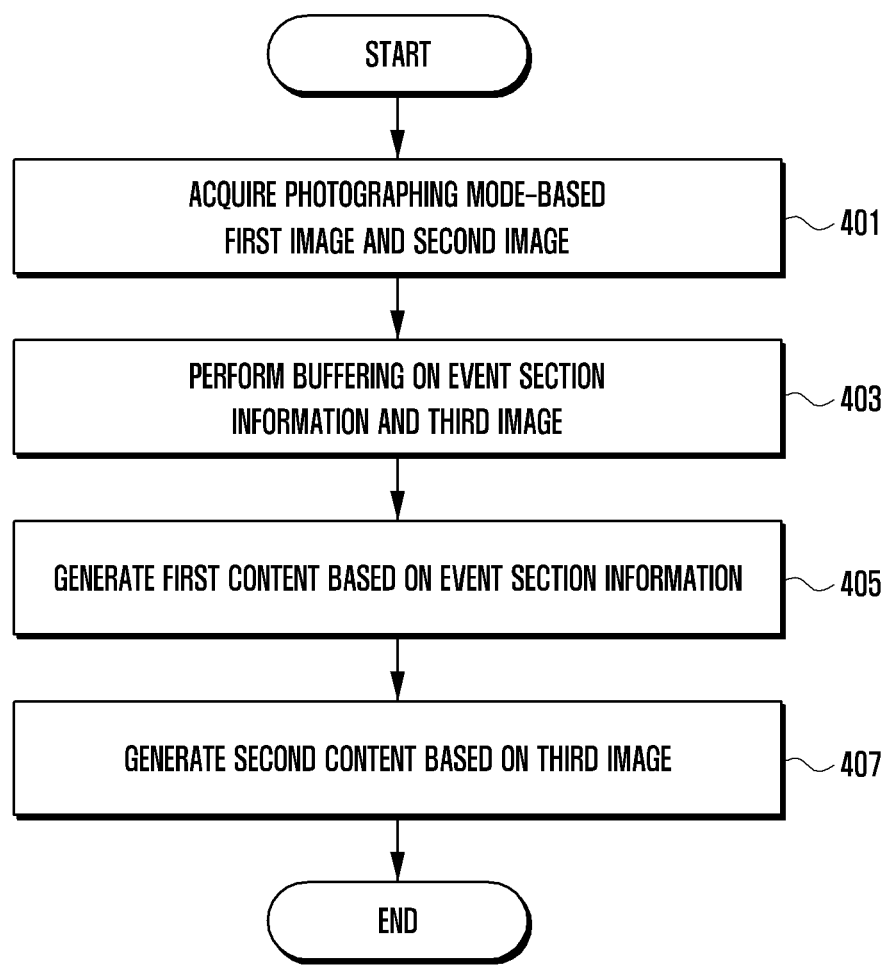
FIG. 4 is a flowchart illustrating a method of generating various types of image content by an electronic device according to an embodiment of the disclosure.

FIG. 4 is a flowchart illustrating a method of generating various types of image content by an electronic device according to an embodiment of the disclosure. The order of operations in FIG. 4 is an example, and each operation may be performed simultaneously or in a different order, or at least one operation may be repeated or omitted.

Referring to FIG. 4, a processor (e.g., the processor 120 of FIG. 1 or the image signal processor 260 of FIG. 2) of an electronic device (e.g., the electronic device 101 of FIG. 1 or the electronic device 300 of FIG. 2) may acquire a plurality of first images and at least one second image through an image sensor (e.g., the image sensor 230 of FIG. 2) for a designated time based on a photographing mode. For example, the photographing mode may be determined based on illuminance information and/or scene information in operation 401.

For example, when receiving a user input for acquiring image content, the processor 120 or 260 may acquire the plurality of first images and the at least one second image through the image sensor by controlling a camera module (e.g., the camera module 180 of FIG. 1) according to the illuminance information and/or the scene information based on the determined photographing mode.

For example, the processor 120 or 260 may determine the photographing mode as one of a first photographing mode (e.g., continuous photographing mode) or a second photographing mode (e.g., general photographing mode) based on the illuminance information and/or the scene information. For example, the illuminance information may be acquired through a sensor module (e.g., the sensor module 176 of FIG. 1) (e.g., illumination sensor). For example, the scene information may be extracted from an image acquired through the image sensor.

For example, the processor 120 or 260 may control the camera module according to the determined photographing mode to acquire a plurality of first images of a first attribute and at least one second image of a second attribute different from the first attribute through the image sensor for a designated time.

For example, the acquired first image and the second image may include original image data (e.g., raw data). For example, the first images are a plurality of preview images (e.g., moving pictures) acquired in the first period for a designated time, and may include a first attribute having a relatively smaller resolution than that of the second image. For example, the second image is at least one captured image (e.g., a still image) acquired for a designated time, and may include a second attribute having a relatively higher resolution than that of the first image.

For example, in the first photographing mode (e.g., continuous photographing mode), the second image may be acquired at a second period different from the first period for a designated time. For example, the second period may be relatively longer than the first period. For example, in the second photographing mode (e.g., the general photographing mode), the second image may be acquired at a third period that is relatively longer than the second period for a designated time.

For example, the designated time during which an operation of acquiring a plurality of images including the first image and/or the second image is performed can be configured within a time longer than the minimum time supported by the electronic device 101 or 300 and shorter than the maximum time. For example, the designated time may be selected or configured by a user input.

According to various embodiments, in operation 403, the processor 120 or 260 may acquire event section information from the plurality of first images output from the image sensor according to the determined photographing mode, and may select and temporarily buffer at least one third image from the plurality of second images.

For example, the processor 120 or 260 may detect motion information from the plurality of first images, and may acquire, when it is determined that an event occurs based on the detected motion information, event section information and temporarily buffer 252 the acquired event section information in a volatile memory (e.g., the volatile memory 251 of FIG. 2) of the memory 250.

For example, the motion information may include motion information (e.g., speed) calculated by tracking the movement of at least one object in the corresponding image. For example, the motion information may be calculated by evaluating (e.g., optical flow) the movement of the object based on a change in landmarks such as a designated pattern in an image, for example, a change in photographing time, a change in brightness, or a change in a background (e.g., the surrounding environment).

For example, whether the event occurs may be determined based on a change in the motion information. For example, it may be determined that an event has occurred when the motion information decreases after an increase in the motion information. For example, it may be determined that the event has occurred when the motion information increases by a designated threshold value or greater.

For example, the event section information may include time information, scene information, and length and/or speed of the section. For example, the event section information may include time information at a time point at which the motion information increases and a time point at which the motion information decreases. For example, the event section information may include scene information (e.g., a scene category or a scene type) including information about an object that is moved in the event section (e.g., a person jumps) and/or movement. For example, the event section information may include time information at a time point at which the motion information increases by a designated threshold value or greater and time information at a time point at which the motion information decreases by the designated threshold value or less. For example, the event section information may include section length information from the time point at which the motion information increases to the time point at which the motion information decreases. For example, the event section information may include speed information such as an average speed and/or a maximum speed of the motion information within the section in which the event occurs.

For example, the processor 120 or 260 may select at least one third image based on the determined photographing mode from the plurality of second images output from the image sensor, and may temporarily buffer 252 the selected third image in the volatile memory 251 of the memory 250.

For example, the processor 120 or 260 may analyze similarity between image frames with respect to the acquired plurality of second images according to the first photographing mode and may select the at least one third image. For example, the similarity between the frames of the plurality of second images may be analyzed based on an image hash value of each frame, and the processor 120 or 260 may exclude frames with high similarity among the frames of the second image output from the image sensor, and may transmit the remaining at least one third image to the volatile memory for temporary buffering.

For example, the processor 120 or 260 may select the at least one third image by analyzing image quality of the plurality of second images acquired according to the second photographing mode. For example, the processor 120 or 260 may detect (e.g., blur detect) image focus for the acquired plurality of second images to exclude images with poor quality due to out of focus, and may transmit the remaining at least one third image to the volatile memory for temporal buffering.

According to various embodiments, the processor 120 or 260 may load a first application (e.g., the first application 255 of FIG. 2) stored in the memory, and may perform the above-described operations 401 and 403 by the loaded first application.

According to various embodiments, the processor 120 or 260 may load a second application (e.g., the second application 256 of FIG. 2) stored in the memory, and may perform operations 405 and 407, which will be described later, by the loaded second application.

According to various embodiments, in operation 405, the processor 120 or 260 may generate first content based on the plurality of first images according to the temporally buffered event section information, and in operation 407, the processor 120 or 260 may generate second content based on the temporarily buffered third image.

For example, the processor 120 or 260 may generate the first content by applying an image effect to at least some of the plurality of first images based on the event section information temporarily buffered in the volatile memory. For example, the processor 120 or 260 may extract frames of the corresponding section among the plurality of first images according to time information and/or length information of the event section information, and may select and apply an image effect to be applied to the frames of the first image extracted based on scene information (e.g., scene category or scene type) of the corresponding event section information to generate at least one video. For example, the generated first content may include at least one of a first video in which the plurality of first images are continuously reproduced in the entire or event section, a second video in which the plurality of first images are reproduced at a relatively faster speed than the first video in the event section, a third video in which the plurality of first images are played at a relatively slower speed than the first video in the event section, a fourth video (e.g., dynamic video) in which the speed of the event section is adjusted as in slow motion by increasing the number of frames per second and/or decreasing the speed during the event section from the plurality of first images, and a fifth video (e.g., highlight video) capable of summarizing and indicating the contents and/or progress of the entire event by adding, for example, a transition effect at the time of conversion between the fourth image and the first image.

For example, the processor 120 or 260 may select the at least one fourth image from the third image temporarily buffered in the volatile memory and may generate second content by applying an image effect based on the scene information (e.g., scene category or scene type).

For example, the processor 120 or 260 may select the at least one fourth image based on information of the buffered at least one third image. For example, the processor 120 or 260 may select the at least one fourth image based on at least one of image quality, brightness information, and color information of the temporarily buffered third image, a composition of an external object (e.g., subject) included in the third image, or face detection information detected from the third image. For example, the image quality may be configured based on focus information (e.g., blur) of the external object included in the third image, noise information included in the third image, or contrast information of the third image.

For example, the image effect to be applied to the at least one fourth image may be applied through a series of operations of changing at least one of color, transparency, style, contrast, or saturation of the fourth image.

Figure 5:
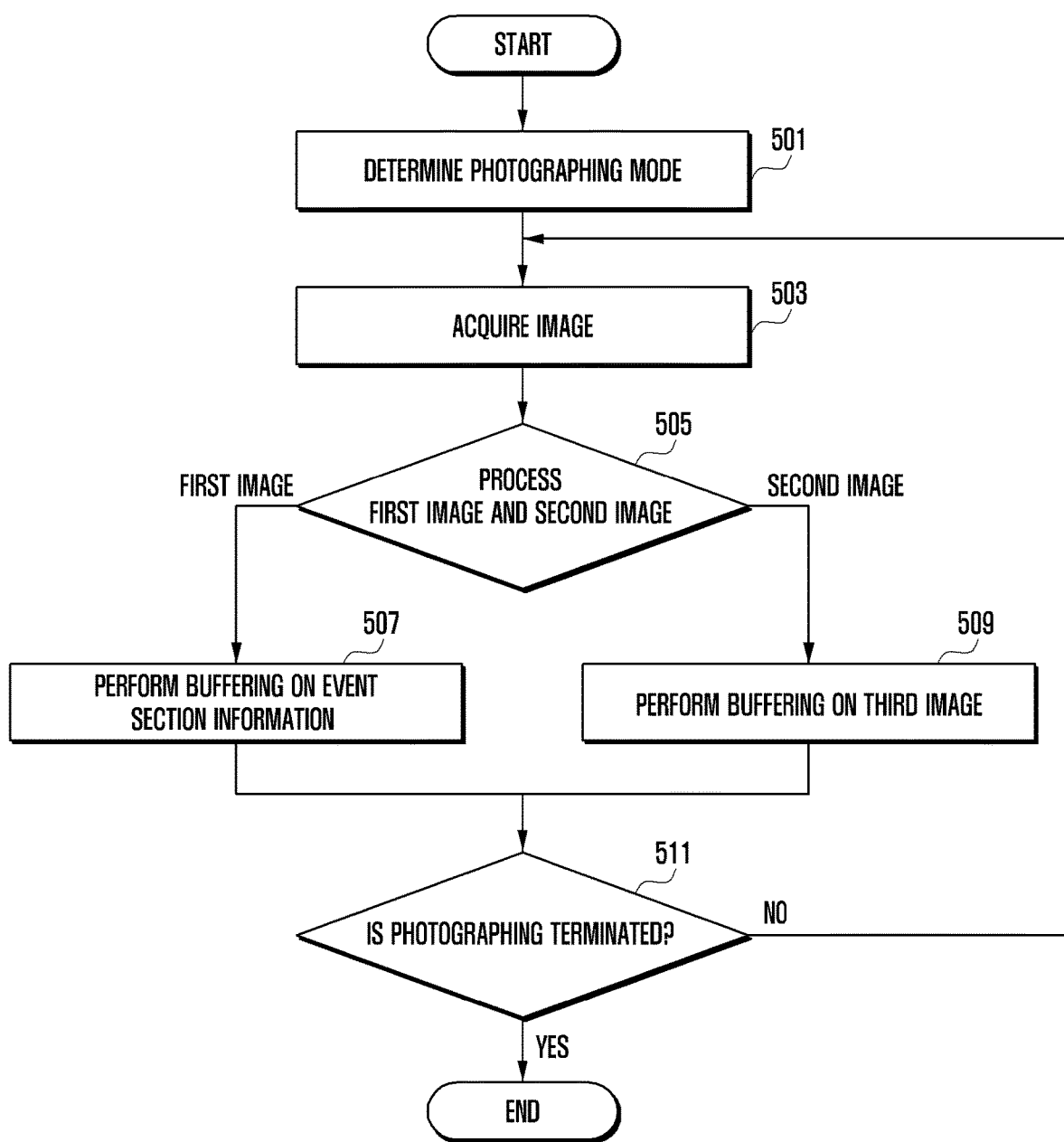
FIG. 5 is a flowchart illustrating a method of acquiring various types of image data according to a photographing mode according to an embodiment of the disclosure.

FIG. 5 is a flowchart illustrating a method of acquiring various types of image data according to a photographing mode according to an embodiment of the disclosure.

According to various embodiments, operations of FIG. 5 may be performed by a processor (e.g., the processor 120 of FIG. 1 or the image signal processor 260 of FIG. 2) of an electronic device (e.g., the electronic device 101 of FIG. 1 or the electronic device 300 of FIG. 2). For example, the processor 120 or 260 may load a first application (e.g., the first application 255 of FIG. 2) stored in a memory (e.g., the memory 250 of FIG. 2), and may perform operations of FIG. 5 by the loaded first application.

Referring to FIG. 5, in operation 501, the processor 120 or 260 may determine a photographing mode based on illuminance information and/or scene information.

For example, when receiving a user input for acquiring image content, the processor 120 or 260 may control a camera module (e.g., the camera module 180 of FIG. 1) based on the illuminance information and/or the scene information to determine a photographing mode for acquiring a corresponding image.

For example, the processor 120 or 260 may determine the photographing mode as one of a first photographing mode (e.g., continuous photographing mode) or a second photographing mode (e.g., general photographing mode) based on the illuminance information and/or the scene information.

For example, the illuminance information may be acquired through a sensor module (e.g., the sensor module 176 of FIG. 1) (e.g., an illuminance sensor). For example, the illuminance information may include a degree of brightness (e.g., measured in units of lux or exposure value (EV)) of a place where the electronic device 101 or 300 is currently located.

For example, the scene information may be extracted from an image acquired through an image sensor (e.g., the image sensor 230 of FIG. 2). For example, the scene information may include a scene category or a scene type. For example, the scene information may include information indicating that a place where the electronic device 101 or 300 is currently located is outdoors or indoors and/or external object information. For example, location information about the place where the electronic device 101 or 300 is currently located, acquired through the sensor module (e.g., global positioning system (GPS)), may be used to supplement or replace the scene information, as information for determining whether the electronic device is located outdoors or indoors.

For example, when it is determined that the electronic device is located outdoors or the corresponding illuminance is high illuminance based on the acquired illuminance information or scene information, the processor 120 or 260 may determine the photographing mode as the first photographing mode. For example, when the corresponding illuminance is low illuminance even though the electronic device is located outdoors according to the scene information, the processor 120 or 260 may determine the photographing mode as the second photographing mode. For example, when the electronic device is located outdoors and the scene information includes a movable external object, the processor may determine the photographing mode as the first photographing mode. For example, when the external device is located outdoors, the scene information includes a movable external object, and the corresponding illuminance is high illuminance, the processor may determine the photographing mode as the first photographing mode.

According to various embodiments, in operation 503, the processor 120 or 260 may control the camera module according to the determined photographing mode to acquire a plurality of first images of a first attribute and at least one second image of a second attribute through an image sensor (e.g., the image sensor 230 of FIG. 2) for a designated time. For example, the first images are a plurality of preview images acquired at a first period for a designated time, and may include a first attribute having a relatively smaller resolution than that of the second image. For example, the second image is at least one captured image acquired for a designated time and may include a second attribute having a relatively higher resolution than that of the first image.

For example, the processor 120 or 260 may acquire, in the first photographing mode, the second image in the second period different from the first period for a designated time. For example, the second period may be relatively longer than the first period. For example, the processor 120 or 260 may acquire, in the second photographing mode, the second image in a third period relatively longer than the second period for the designated time.

According to various embodiments, in operation 505, the processor 120 or 260 may proceed and process a separate operation with respect to each of the plurality of first images and at least one second image output from the image sensor according to the determined photographing mode.

According to various embodiments, the processor 120 or 260 may detect motion information from the plurality of first images output from the image sensor in operation, and may acquire event section information 253 based on the detected motion information to temporarily buffer the acquired event section information in a volatile memory (the volatile memory 251 of FIG. 2) of a memory 250 in operation 507.

For example, the motion information may include motion information (e.g., speed) calculated by tracking the movement of at least one object in the corresponding image. For example, whether an event occurs may be determined based on a change in the motion information.

For example, the event section information may include time information, scene information, and length and/or speed of the section in which the event occurs. For example, the time information for the event section may include the time of the starting point and the end point of the event section determined based on the motion information. For example, the scene information may include a scene category and/or a scene type, such as information about an object that is moved in the event section and/or motion. For example, the length of the event section may include the length of time or the number of frames from a frame at the start of the event section to a frame at the end of the event section. For example, the speed of the event section may include an average speed and/or a maximum speed of motion information in a section where the event occurs.

According to various embodiments, in operation 509, the processor 120 or 260 may select at least one third image from the plurality of second images output from the image sensor and may temporarily buffer 252 the selected third image in a volatile memory 251 of the memory 250.

For example, the processor 120 or 260 may select at least one third image by analyzing similarity between image frames with respect to the plurality of second images acquired according to the first photographing mode. For example, the similarity between the frames of the plurality of second images may be analyzed based on the image hash value of each frame. For example, the processor 120 or 260 may select at least one third image by analyzing image quality (e.g., blur detect) for the plurality of second images acquired according to the second photographing mode.

According to various embodiments, in operation 511, the processor 120 or 260 may determine whether to terminate the photographing by confirming whether the designated time has expired or whether a photographing end input is received from the user. For example, the processor 120 or 260 may continuously perform operations 503 to 509 until the photographing is terminated.

Figure 6:
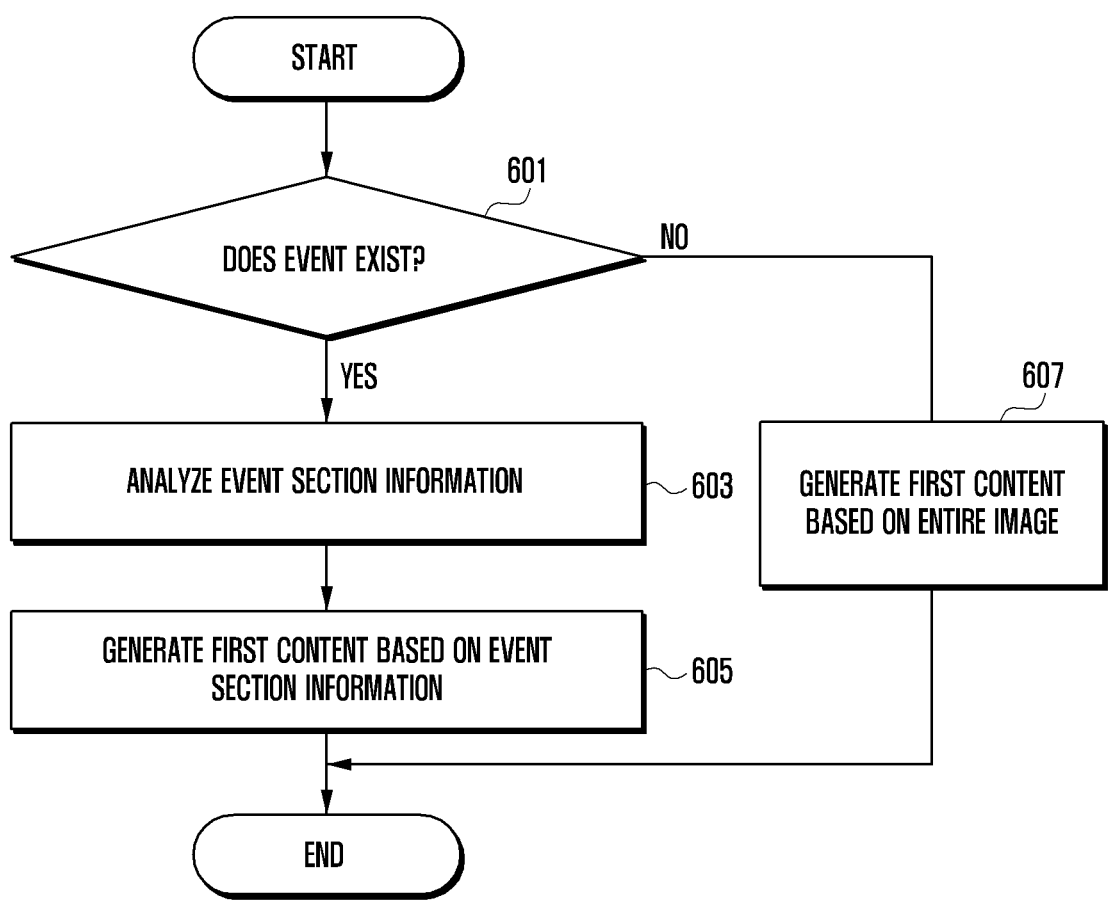
FIG. 6 is a flowchart illustrating an operation of generating moving image content according to an embodiment of the disclosure.

FIG. 6 is a flowchart illustrating an operation of generating moving image content according to an embodiment of the disclosure.

According to various embodiments, the operations of FIG. 6 may be performed by a processor (e.g., the processor 120 of FIG. 1 or the image signal processor 260 of FIG. 2) of an electronic device (e.g., the electronic device 101 of FIG. 1 or the electronic device 300 of FIG. 2). For example, the processor 120 or 260 may load a second application (e.g., the second application 256 of FIG. 2) stored in a memory (e.g., the memory 250 of FIG. 2), and may perform the operations of FIG. 6 by the loaded second application.

Referring to FIG. 6, in operation 601, the processor 120 or 260 may identify whether there is an event from event section information temporarily buffered in the memory. In operation 603, the processor 120 or 260 may analyze the event section information when there is the event. For example, based on the time of the start and end points of the event section and the length of the event section, a frame position at which the event starts and a frame position at which the event ends may be identified from the event section information. For example, an image effect to be applied to image frames in the event section may be determined by identifying a scene category, a scene type, and/or a speed of the event section.

According to various embodiments, in operation 605, the processor 120 or 260 may generate first content based on a plurality of first images based on the event section information. For example, based on scene information (e.g., a scene category and/or a scene type) of the plurality of first images and the speed of the event section, the processor 120 or 260 may select a type of a video (e.g., output video) to be generated from the first image. For example, the processor 120 or 260 may selectively change at least one of a section length, a reproduction speed, a reproduction order, or an image effect based on the scene information based on the event section information to generate a video in which at least some of the plurality of first images are continuously reproduced.

For example, the first content may be generated by applying a content map as shown in Table 1 below to the plurality of first images based on the event section information. According to Table 1, "o" may represent that a corresponding output video is generated using the plurality of first images of a corresponding scene type. "x" may represent that a corresponding output video is not generated using the plurality of first images of a corresponding scene type. "only FF" may represent that only fast forward video is generated using the plurality of first images of a corresponding scene type. "intro" may represent intro part video is generated using the plurality of first images of a corresponding scene type.

For example, the scene category, referring to the content map, may include a place (indoors), clothing, object, pet, portrait, people, vehicle, landscape, or text. For example, the scene type may include subtypes (e.g., whether the place is indoors or outdoors, whether the pet is a cat or a dog, an object type, whether a subject of a portrait is a baby, a woman, or a face, whether a landscape is a tree, mountain, beach, sky, sunrise, city, or sunset) of the scene category.

For example, the generated first content may include a first video (e.g., original) in which the plurality of first images are continuously reproduced in the event section. For example, the generated first content may include a second video (e.g., fast-forward) in which the plurality of first images are reproduced at a relatively faster speed than the first video in the event section. For example, the generated first content may include a third video (e.g., slow video) in which the plurality of first images are reproduced at a relatively slower speed than the first video in the event section. For example, when the generated first content has a high speed of the event section or a short length of the section, the generated first content may include a fourth video (e.g., dynamic video) obtained by adjusting the speed of the event section as in slow motion through an increase in the number of frames per second during the event section and/or a speed reduction from the plurality of first images. For example, the generated first content may include a fifth video (e.g., highlight video) in which at least one fourth image selected from the third images and some of the first images corresponding to the event section are sequentially arranged based on time information (e.g., time stamp) to summarize and indicate the contents and/or progress of the entire event by adding, for example, a transition effect at the time of conversion between the fourth image and the first image. For example, the first content may include a sixth

TABLE 1

| scene category | scene type | Output video | | | | | |
|---|---|---|---|---|---|---|---|
| | | Original (front or rear) | dynamic/ fastforward | highlight | boomerang | reverse | relighting |
| indoor | indoor, stage | o | only FF | o | x | o | x |
| clothing | clothing, shoe | o | only FF | o | x | x | x |
| object | food, drink, flower | o | o | o (intro only) | x | x | x |
| pet | animal, cat, dog | o | o | o | o | x | x |
| vehicle | vehicle | o | o | o | x | o | x |
| landscape | mountain, beach, sky, waterfall, waterside, scenery, sunset, sunrise, snow, city, nightview | o | only FF | o | x | x | o |
| portrait | | o | o | o | o | x | x |
| people | | o | o | o | o | x | x |
| text | | o | only FF | o | x | x | x |
| default | | o | o | o | o | x | x | video (e.g., boomerang) in which the plurality of first images are reproduced in order and then reproduced in reverse order in the event section. For example, the first content may include a seventh video (e.g., reverse) in which the plurality of first images are reproduced in reverse order in the event section. For example, the first content may include an eighth video (e.g., relighting) expressing the passage of time during the day and night by changing the color and brightness of the background when the plurality of first images includes a landscape photo in the event section. For example, an image effect applicable to the first image based on the scene information may be configured as a content map as described above and may be stored in a memory (e.g., the memory 130 of FIG. 1 or the memory 250 of FIG. 2 or 3) in advance.

According to various embodiments, in operation 607, the processor 120 or 260 may generate the first content based on the plurality of first images when the event section does not exist. For example, the first content may include a video in which the plurality of first images are continuously reproduced. For example, the first content may be generated by applying a content map as shown in Table 1 above to the plurality of first images.

Figure 7:
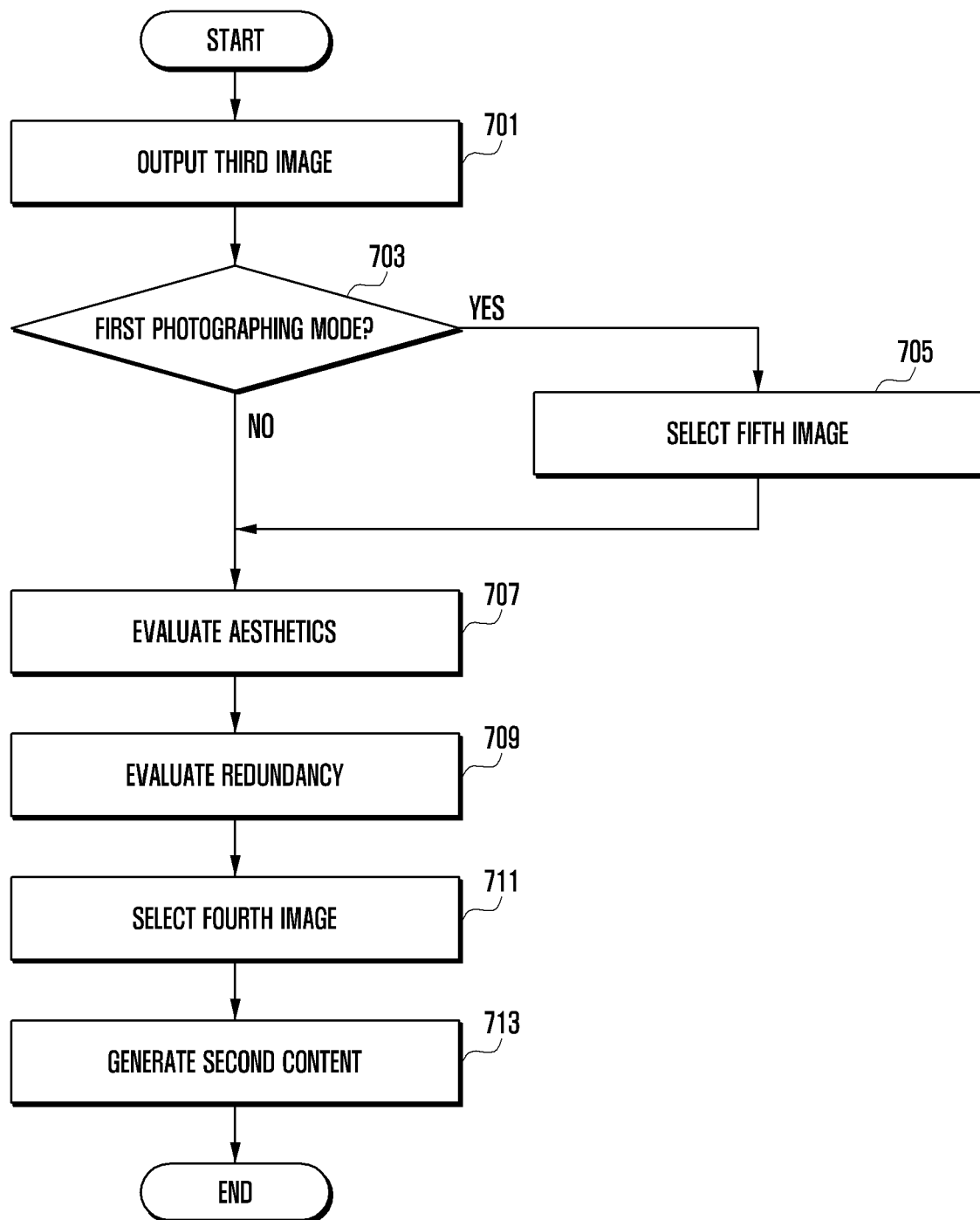
FIG. 7 is a flowchart illustrating an operation of generating still image content according to an embodiment of the disclosure.

FIG. 7 is a flowchart illustrating an operation of generating still image content according to an embodiment of the disclosure.

According to various embodiments, the operations of FIG. 7 may be performed by a processor (e.g., the processor 120 of FIG. 1 or the image signal processor 260 of FIG. 2) of an electronic device (e.g., the electronic device 101 of FIG. 1 or the electronic device 300 of FIG. 2). For example, the processor 120 or 260 may load a second application (e.g., the second application 256 of FIG. 2) stored in a memory (e.g., the memory 250 of FIG. 2), and may perform the operations of FIG. 7 by the loaded second application.

Referring to FIG. 7, in operation 701, the processor 120 or 260 may sequentially output a third image 252 temporarily buffered in a volatile memory 251.

According to various embodiments, the processor 120 or 260 may determine whether a photographing mode is a first photographing mode (e.g., burst shot) in operation 703. When the photographing mode is not the first photographing mode, the processor 120 or 260 may proceed to operation 707 to evaluate aesthetics, may perform redundancy evaluation in operation 709, and may select a fourth image from the third image in operation 711 according to the evaluation result(s) or the result of an estimation based on operations 707 and 709. For example, the order of operations 707 and 709 is an example and is not limited thereto, and the order may be changed, or at least some may be simultaneously performed, or some may be omitted.

According to various embodiments, when the photographing mode is the first photographing mode in operation 703, the processor may proceed to operation 705 to perform image analysis on the temporarily buffered third image and select at least one fifth image, may proceed to operations 707 and 709 to evaluate aesthetics of the selected fifth image and perform redundancy evaluation, and may select the fourth image among the fifth images in operation 711 according to the evaluation result. For example, in the first photographing mode, a plurality of second images may be acquired to reduce the number of images through the above-described third image selection operation, and image quality may be analyzed through the fifth image selection operation to efficiently reduce the number of images to be evaluated in a candidate image selection operation for generating the second content.

According to various embodiments, the image analysis on the third image performed in operation 705 may include, for example, blur detection, blink detection, expression based filter, and/or affine similarity. For example, operation 705 may include an operation of rapidly analyzing the third images acquired in the continuous photographing mode and selecting images with appropriate quality.

Figure 8:
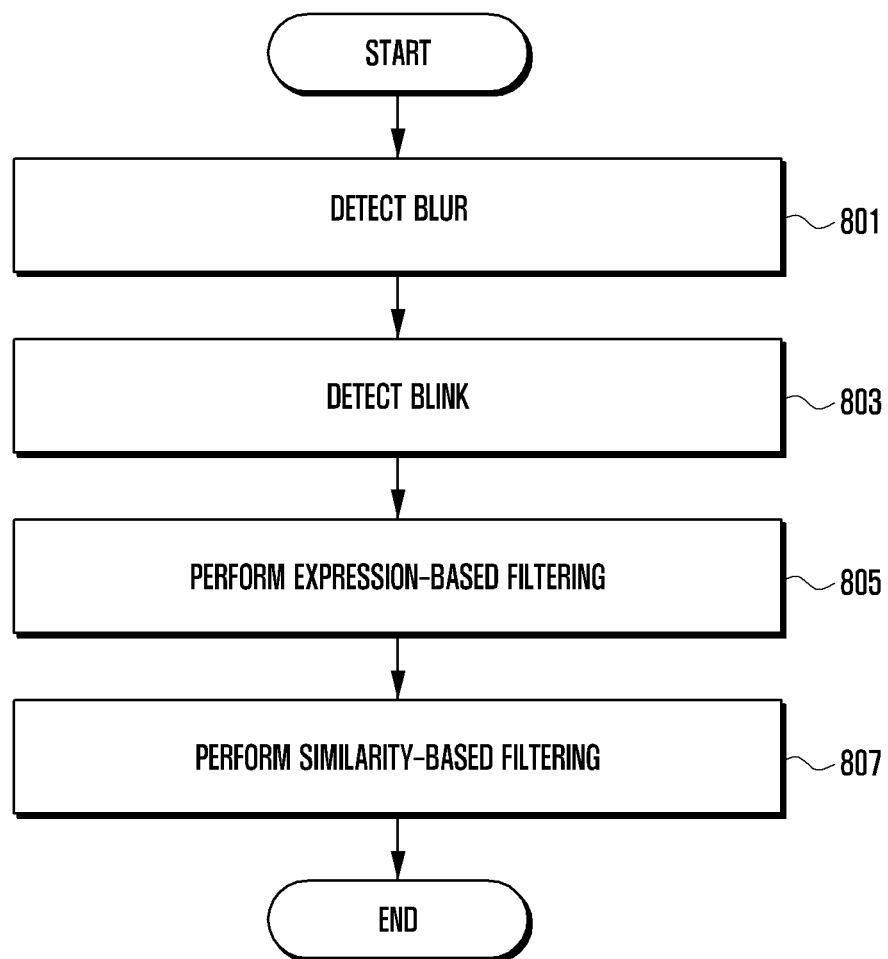
FIG. 8 is a flowchart illustrating an image selection operation according to a burst shot mode according to an embodiment of the disclosure.

FIG. 8 is a flowchart illustrating an image selection operation according to a burst shot mode according to an embodiment of the disclosure.

FIG. 8 may be a flowchart illustrating in more detail a fifth image selection operation of operation 705 of FIG. 7 according to the first photographing mode according to various embodiments. The order of each operation in FIG. 8 is an example and is not limited thereto, and the order may be changed, some thereof may be performed simultaneously, or some thereof may be omitted. For example, in a method, at least one of operations 801, 803, 805 and 807 may be performed, simultaneously or in any order. The operation of FIG. 8 may be performed by, for example, an artificial intelligence program learned based on image training data. For example, the processor 120 or 260 may load an artificial intelligence program (e.g., the program 140 of FIG. 1) stored in a memory (e.g., the memory 130 of FIG. 1), and may perform operations of FIG. 8 by the loaded artificial intelligence program.

Referring to FIG. 8, in operation 801, the processor 120 or 260 may perform high-level blur detection. For example, the processor 120 or 260 may detect whether an image is blurred according to focus information of an object included in the third image, and may exclude an image with a blurred focus from selection. For example, the processor 120 or 260 may determine an image to exclude based on a result of comparing the focus information to a predetermined or calculated value.

According to various embodiments, in operation 803, the processor 120 or 260 may perform blink detection. For example, the processor 120 or 260 may detect eyes through face detection or landmark detection (e.g., extracting landmark from eyebrows, eyes, nose, lips, and/or jaw lines) of an object included in the third image, and may exclude images with closed eyes from the selection according to whether the eyes are closed.

According to various embodiments, the processor 120 or 260 may perform expression-based filtering in operation 805. For example, the processor 120 or 260 may calculate facial expression scores through face detection, landmark detection, or head detection (e.g., detecting landmarks from a region from the tip of the head to the neck) from the object included in the third image, thereby excluding images (e.g., distorted facial expression) with low facial expression scores from the selection. For example, the processor 120 or 260 may determine an image to exclude based on a result of comparing the calculated facial expression score(s) to predetermined or calculated score(s). For example, a calculated facial expression score being lower than a predetermined score may result in a corresponding image being excluded due to having a low facial expression score.

According to various embodiments, the processor 120 or 260 may perform similarity-based filtering in operation 807. For example, the processor 120 or 260 may compare similarity of edge-based shape extracted from the image between the image frames included in the third image to exclude image frames (images acquired in a section where there is no movement for a predetermined time) with high structural similarity from the selection. For example, the processor 120 or 260 may determine an image to exclude based on a result of comparing the similarity of the edge-based shape extracted from the image to a predetermined or calculated value. For example, if the result indicates the similarity of the edge-based shape extracted from the image is greater than a predetermined value, the image may be excluded as having high structural similarity.

Referring again to FIG. 7, the processor 120 or 260 may perform aesthetic evaluation on the fifth image or the third image in operation 707. For example, the processor 120 or 260 may perform esthetic evaluation on the fifth image selected in operation 705 from the third image acquired according to the first photographing mode. For example, the processor 120 or 260 may perform esthetic evaluation on the third image acquired according to the second photographing mode.

Figure 9:
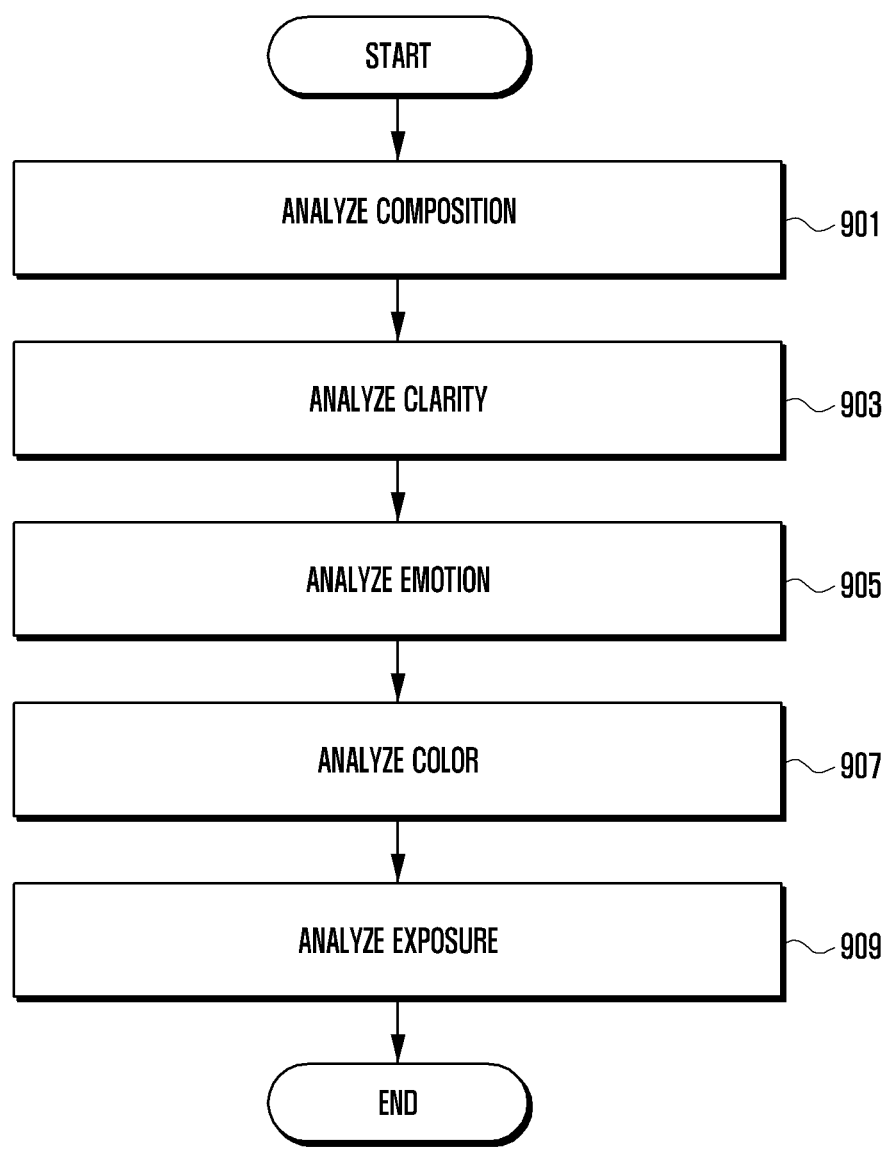
FIG. 9 is a flowchart illustrating an esthetic evaluation operation according to an embodiment of the disclosure.

FIG. 9 is a flowchart illustrating an esthetic evaluation operation according to an embodiment of the disclosure.

FIG. 9 may be a flowchart illustrating in more detail the esthetic evaluation operation of operation 707 according to various embodiments. The order of each operation in FIG. 9 is an example and is not limited thereto, and the order may be changed, some thereof may be performed simultaneously, or some thereof may be omitted. The operation of FIG. 9 may be performed by, for example, an artificial intelligence program learned based on image training data. For example, the processor 120 or 260 may load an artificial intelligence program (e.g., the program 140 of FIG. 1) stored in a memory (e.g., the memory 130 of FIG. 1), and may perform operations of FIG. 9 by the loaded artificial intelligence program.

Referring to FIG. 9, the processor 120 or 260 may perform composition evaluation (or analysis) in operation 901. For example, the processor 120 or 260 may calculate a composition score based on the composition of objects included in a corresponding image.

According to various embodiments, the processor 120 or 260 may perform a clarity evaluation (or analysis) in operation 903. For example, the processor 120 or 260 may calculate a clarity score based on brightness, noise, or contrast of the image.

According to various embodiments, the processor 120 or 260 may perform an emotion evaluation (or analysis) in operation 905. For example, the processor 120 or 260 may recognize a face of an object included in the image, may detect eyebrows, eyes, nose, and/or a mouth therefrom, and may calculate a facial expression score based thereon.

According to various embodiments, the processor 120 or 260 may perform color evaluation (or analysis) in operation 907. For example, the processor 120 or 260 may extract color information from the image and may calculate a color score based on the diversity of colors.

According to various embodiments, the processor 120 or 260 may perform an exposure evaluation (or analysis) in operation 909. For example, the processor 120 or 260 may calculate a saturation score based on exposure information of the image.

Referring again to FIG. 7, the processor 120 or 260 may perform redundancy evaluation on the fifth image or the third image in operation 709. For example, the processor 120 or 260 may perform redundancy evaluation on the fifth image selected in operation 705 from the third image acquired according to the first photographing mode. For example, the processor 120 or 260 may perform redundancy evaluation on the third image acquired according to the second photographing mode. For example, the processor 120 or 260 may exclude similar images from selection according to the redundancy evaluation in operation 709. It will be appreciated that the redundancy evaluation operation may be performed in combination with the aesthetic evaluation operation or that only one of the redundancy evaluation operation and the aesthetic evaluation operation may be performed.

Figure 10:
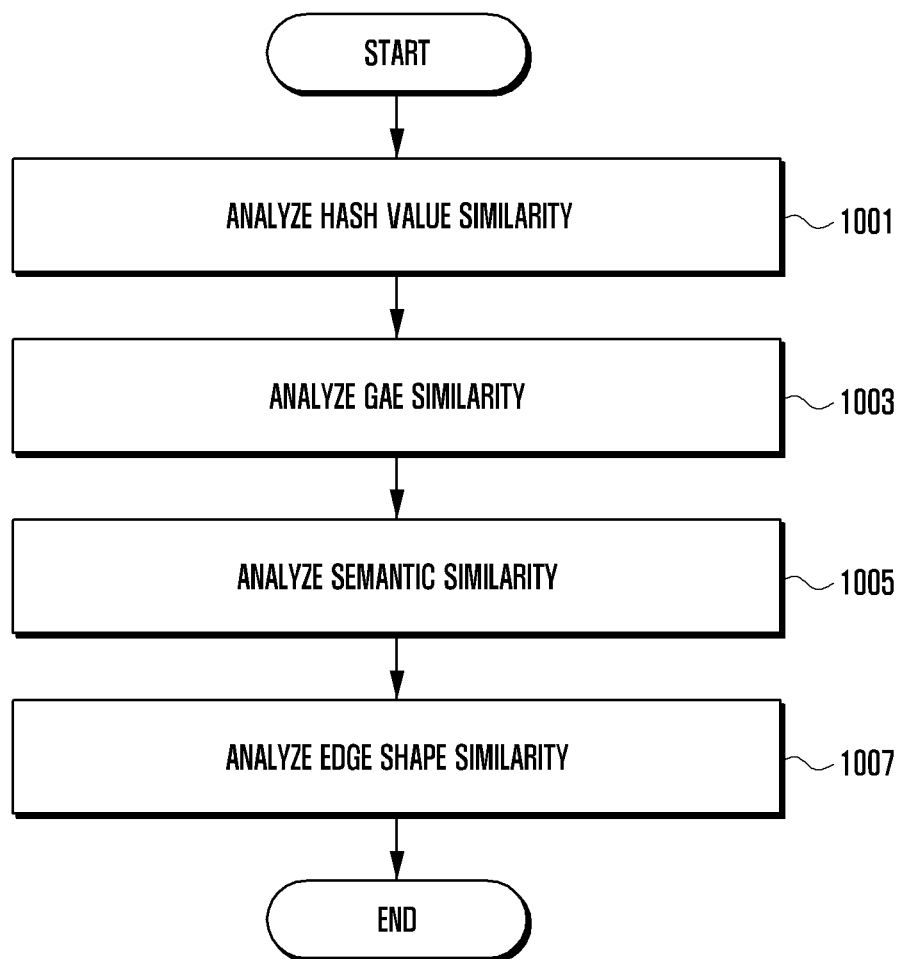
FIG. 10 is a flowchart illustrating a redundancy evaluation operation according to an embodiment of the disclosure.

FIG. 10 is a flowchart illustrating a redundancy evaluation operation according to an embodiment of the disclosure.

FIG. 10 is a flowchart illustrating in more detail the redundancy evaluation operation of operation 709 according to various embodiments. The order of each operation in FIG. 10 is an example and is not limited thereto, and the order may be changed, some thereof may be performed simultaneously, or some thereof may be omitted. The operation of FIG. 10 may be performed by, for example, an artificial intelligence program learned based on image training data. For example, the processor 120 or 260 may load an artificial intelligence program (e.g., the program 140 of FIG. 1) stored in a memory (e.g., the memory 130 of FIG. 1), and may perform operations of FIG. 10 by the loaded artificial intelligence program.

Referring to FIG. 10, in operation 1001, the processor 120 or 260 may calculate and compare hash values from image frames to perform similarity evaluation (or analysis) based on the hash values. For example, images with similar hash values may be excluded from selection.

According to various embodiments, in operation 1003, the processor 120 or 260 may evaluate the similarity through analysis of evaluating age (gender age extraction (GAE)) from the image. For example, the processor 120 or 260 may calculate a facial expression score based on the GAE method to compare the similarity of the images.

According to various embodiments, in operation 1005, the processor 120 or 260 may evaluate the similarity through semantic analysis based on color information from the image. For example, similar images may be excluded from selection by calculating a color score based on the color information of the images and comparing the similarities of the images based on the calculated color score.

According to various embodiments, the processor 120 or 260 may extract an edge from the image in operation 1007 and may analyze the similarity by comparing the shape of the edge. For example, images having similar shapes of edges between the image frames may be excluded from selection.

Referring again to FIG. 7, in operation 711, the processor 120 or 260 may select a fourth image as a candidate image for generating second content based on the esthetic evaluation of the fifth image or the third image in operation 707 and/or the redundancy evaluation of operation 709. For example, the processor 120 or 260 may select a plurality of fourth images.

According to various embodiments, the processor 120 or 260 may generate the second content based on the selected fourth image in operation 713.

For example, the processor 120 or 260 may generate at least one still image (as the second content) based on scene information (e.g., a scene category and/or a scene type) of the selected at least one fourth image. For example, the processor 120 or 260 may select an image effect to be applied in response to the scene category and/or the scene type of the selected at least one fourth image.

For example, the processor 120 or 260 may generate the second content by applying a content map as shown in Table 2 below to the selected at least one fourth image. According to Table 2, "o" and "x" may respectively represent that a corresponding output video is or is not generated using the plurality of first images of a corresponding scene type. "BM1" to "BM5" may represent 5 exemplary images of the at least one fourth image.

TABLE 2

| Scene category | Scene type | Output image ||||||||
|---|---|---|---|---|---|---|---|---|---|
| | | Original + auto enhance | Original | smart crop | AI filter | Bokeh/ color picker | Collage | B/W | ultra-wide |
| Indoor | indoor, stage | BM1, BM2 | BM3, BM4, BM5 | o | o | x | x | o | x |
| Clothing | clothing, shoe | BM1 | BM2, BM3 | o | o | x | x | x | x |
| Object | food, drink, flower | BM1 | BM2, BM3 | o | x | x | o | x | x |
| pet | animal, cat, dog | BM1, BM2 | BM3, BM4, BM5 | o | o | x | o | x | x |
| Vehicle | vehicle | BM1 | BM2, BM3 | o | x | x | x | x | x |
| Landscape | mountain, beach, sky, waterfall, waterside, scenery, sunset, sunrise, snow, city, night view | BM1, BM2 | BM3, BM4, BM5 | x | o | x | x | o | o (only bright outdoors) |
| Portrait | | BM1, BM2, BM3 | BM4, BM5 | o | o | o | o | o | x |
| people | | BM1, BM2 | BM3, BM4 | o | o | x | o | o | o (only bright outdoors) |
| Text | | x | BM1, BM2, BM3 | x | x | x | x | x | x |
| Default | | BM1, BM2 | BM3, BM4, BM5 | o | o | x | x | o | x |

For example, the scene category may include place, clothing, object, pet, portrait, people, vehicle, landscape, or text. For example, the scene type may include subtypes (e.g., whether the place is indoors or outdoors, whether the pet is a cat or a dog, an object type, whether a subject of a portrait is a baby, a woman, or a face, whether a landscape is a tree, mountain, beach, sky, sunrise, city, or sunset) of the scene category.

For example, based on the content map in Table 2, among the fourth images (e.g., BM1, BM2, BM3, BM4 and/or BM5), original and/or automatic image enhancement (e.g., auto enhance) images can be provided for the highest score image (e.g., BM1) and/or the lower score image (e.g., BM2 and/or BM3) according to the evaluation result. For example, based on the content map, the original image may be provided for one or more of the at least one fourth image (e.g., BM1, BM2, BM3, BM4 and/or BM5). For example, an image to which an image effect based on the content map is applied may be provided to at least one of the selected at least one fourth image (e.g., BM1, BM2, BM3, BM4, and/or BM5). For example, based on the scene information of the original image, the image effect may include automatic image quality correction (e.g., auto enhance), changing a composition by capturing a portion of the image from the original image to a recommended composition (e.g., smart crop), image effects based on the scene information (e.g., various photo filter effects (AI filters) through a series of operations that change at least one of color, transparency, style, contrast or saturation), changing the color or focus of the background (e.g., Bokeh/color picker) for a portrait, creating a collage of small photos captured from multiple images, creating black-and-white images (e.g. B/W), or providing images with very large aspect ratios relative to portrait (e.g. ultra-wide).

The image effect applicable based on the above-described scene information may be configured as, for example, the content map as described in the example of Table 2 and may be stored in a memory (e.g., the memory 130 of FIG. 1 or the memory 250 of FIG. 2 or 3) in advance.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
an image sensor;
an illuminance sensor, the illuminance sensor being separate from the image sensor;

a processor configured to be operatively connected to the image sensor and the illuminance sensor; and memory configured to be operatively connected to the processor, wherein the memory stores instructions which, when executed by the processor, cause the electronic device to:

acquire a plurality of first images having a first attribute and at least one second image having a second attribute for a designated time by controlling the image sensor according to a photographing mode of the image sensor determined based on illuminance detected through the illuminance sensor and scene information detected through the image sensor, extract information on an event section when an event is detected from the plurality of first images, and select and buffer at least one third image from the at least one second image according to the photographing mode, generate at least one piece of first content based on the information on the event section of the plurality of first images, and select at least one fourth image by evaluating at least some of the at least one third image, and generate at least one piece of second content based on the selected at least one fourth image, wherein the instructions further cause the electronic device to:

acquire the plurality of first images in a first rate for the designated time, acquire the at least one second image in a second rate in a first photographing mode according to the determined photographing mode, and acquire the at least one second image in a third rate in a second photographing mode, and wherein the second rate is configured to be relatively longer than the first rate and the third rate is configured to be relatively longer than the second rate.

2. The electronic device of claim 1, wherein the instructions further cause the electronic device to select the at least one third image based on similarity between image frames with respect to the at least one second image in the first photographing mode.

3. The electronic device of claim 1, wherein the instructions further cause the electronic device to select the at least one third image based on image quality of the at least one second image in the second photographing mode.

4. The electronic device of claim 1, wherein the instructions further cause the electronic device, in the first photographing mode, to: select at least one fifth image by analyzing the at least one third image; and select the at least one fourth image by evaluating the at least one fifth image.

5. The electronic device of claim 4, wherein the analyzing of the at least one third image is configured to include at least one of blur detection, blink detection, expression-based filtering, or affine similarity with respect to the third image.

6. The electronic device of claim 1, wherein the instructions further cause the electronic device to generate the at least one piece of second content through at least one of image effect application, image quality correction, composition change, or collage generation which changes color, transparency, style, contrast, or saturation for at least some elements in the at least one fourth image based on scene information of the at least one fourth image.

7. The electronic device of claim 1, wherein the instructions further cause the electronic device to:

acquire motion information from the plurality of first images; and extract the event section information based on a change in the motion information.

8. The electronic device of claim 7, wherein the event section information includes at least one of time information, scene information, length information, or speed information for the event.

9. The electronic device of claim 8, wherein the instructions further cause the electronic device to generate a video in which at least some of the plurality of first images are continuously reproduced by selectively changing at least one of a section length, a reproduction speed, a reproduction order, or an image effect based on the scene information based on the event section information.

10. A method of an electronic device including an illuminance sensor and an image sensor, the method comprising:

acquiring a plurality of first images having a first attribute and at least one second image having a second attribute for a designated time by controlling the image sensor according to a photographing mode of the image sensor determined based on illuminance detected through the illuminance sensor and scene information detected through the image sensor, the illuminance sensor being separate from the image sensor;

extracting information on an event section when an event is detected from the plurality of first images, and selecting and buffering at least one third image from the at least one second image according to the photographing mode;

generating at least one piece of first content based on the information on the event section of the plurality of first images; and selecting at least one fourth image by evaluating at least some of the at least one third image, and generating at least one piece of second content based on the selected at least one fourth image, wherein the acquiring of the plurality of first images comprises:

acquiring the plurality of first images in a first rate for the designated time, acquiring the at least one second image in a second rate in a first photographing mode according to the determined photographing mode, and acquiring the at least one second image in a third rate in a second photographing mode, and wherein the second rate is configured to be relatively longer than the first rate and the third rate is configured to be relatively longer than the second rate.

11. The method of claim 10, wherein the buffering comprises selecting the at least one third image based on similarity between image frames with respect to the at least one second image in the first photographing mode.

12. The method of claim 10, wherein the buffering comprises selecting the at least one third image based on image quality of the at least one second image in the second photographing mode.

13. The method of claim 10, further comprising:

selecting at least one fifth image by analyzing the at least one third image in the first photographing mode, wherein the generating of the second content comprises selecting the at least one fourth image by evaluating the at least one fifth image.

14. The method of claim 13, wherein the analyzing of the at least one third image includes at least one of blur detection, blink detection, expression-based filter, or affine similarity with respect to the third image.

15. The method of claim 10, wherein the generating of the second content comprises generating the at least one piece of second content through at least one of image effect application, image quality correction, composition change, or collage generation which changes color, transparency, style, contrast, or saturation for at least some elements in the at least one fourth image based on scene information of the at least one fourth image.

16. The method of claim 10, wherein the buffering comprises acquiring motion information from the plurality of first images and extracting the event section information based on a change in the motion information.

17. The method of claim 16, wherein the event section information includes at least one of time information, scene information, length information, or speed information for the event.

18. The method of claim 17, wherein the generating of the first content comprises generating a video in which at least some of the plurality of first images are continuously reproduced by selectively changing at least one of a section length, a reproduction speed, a reproduction order, or an image effect based on the scene information based on the event section information.

19. The electronic device of claim 1,
wherein when the illuminance is 2000 lux or more or 1800 exposure value (EV) or more, the photographing mode is a continuous photographing mode, and
wherein when the illuminance is 800 lux or less or 1000 EV or less, the photographing mode is a general photographing mode.

* * * * *